United States Patent
Wang et al.

(10) Patent No.: US 7,815,843 B2
(45) Date of Patent: Oct. 19, 2010

(54) PROCESS FOR ANODE TREATMENT OF SOLID OXIDE FUEL CELL—MEMBRANE ELECTRODE ASSEMBLY TO UPGRADE POWER DENSITY IN PERFORMANCE TEST

(75) Inventors: Chun-Hsiu Wang, Taoyuan County (TW); Maw-Chwain Lee, Taoyuan County (TW); Wei-Xin Kao, Taoyuan County (TW); Tai-Nan Lin, Taoyuan County (TW); Yang-Chuang Chang, Taoyuan County (TW); Li-Fu Lin, Taoyuan County (TW)

(73) Assignee: Institute of Nuclear Energy Research, Tiaan Village, Longtan, Taoyuan (TW)

( * ) Notice: Subject to any disclaimer, the term of this patent is extended or adjusted under 35 U.S.C. 154(b) by 31 days.

(21) Appl. No.: 11/964,724

(22) Filed: Dec. 27, 2007

(65) Prior Publication Data
US 2009/0166907 A1  Jul. 2, 2009

(51) Int. Cl.
*B28B 1/00* (2006.01)
*H01M 4/88* (2006.01)
(52) U.S. Cl. .................. 264/618; 264/620; 429/45; 502/101
(58) Field of Classification Search .............. 264/614, 264/620, 618; 429/45; 502/101
See application file for complete search history.

(56) References Cited

U.S. PATENT DOCUMENTS

| | | | | |
|---|---|---|---|---|
| 4,883,497 A | * | 11/1989 | Claar et al. | 29/623.5 |
| 5,543,239 A | * | 8/1996 | Virkar et al. | 429/33 |
| 6,436,565 B1 | * | 8/2002 | Song et al. | 429/31 |
| 2003/0194592 A1 | * | 10/2003 | Hilliard | 429/32 |
| 2005/0074650 A1 | * | 4/2005 | Sridhar et al. | 429/30 |
| 2005/0173061 A1 | * | 8/2005 | Xie | 156/309.3 |
| 2005/0181253 A1 | * | 8/2005 | Finnerty et al. | 429/30 |
| 2006/0014068 A1 | * | 1/2006 | Boysen et al. | 429/33 |
| 2007/0166593 A1 | * | 7/2007 | Hoshino et al. | 429/33 |
| 2008/0107948 A1 | * | 5/2008 | Yamanis | 429/33 |

OTHER PUBLICATIONS

Richerson, David W. Modern Ceramic Engineering. New York, Marcel Dekker, 1992. pp. 596-599.*

* cited by examiner

*Primary Examiner*—Jason L Lazorcik
*Assistant Examiner*—Erin Snelting

(57) ABSTRACT

This invention describes the process for fabrication of a high conductivity and low resistance solid oxide fuel cell. An anode substrate is mainly prepared via tape casting technique and modified by abrasion and polish process. Electrolyte is fabricated onto the polished side by thin film technologies and can attach well in the cross section. Grinding surface of anode side about 10-30 μum after finish of MEA combination can get a high conductivity and low resistance unit cell and enhance cell performance effectively.

2 Claims, 6 Drawing Sheets

PROCESS FOR ANODE TREATMENT OF SOLID OXIDE FUEL CELL—MEMBRANE ELECTRODE ASSEMBLY TO UPGRADE POWER DENSITY IN PERFORMANCE TEST

BACKGROUND OF THE INVENTION

1. Field of the Invention

The invention relates to a novel manufacturing process for solid oxide fuel cell-membrane electrolyte assembly (SOFC-MEA). It is a tape casting process to produce electrode substrate. After two-stage abrasion and polish, the substrate is subject to membrane fabrication processes like screen printing/sputtering/spin coating/spray coating etc., and then SOFC with excellent interfacial adhesion between electrodes and electrolyte is produced to effectively improve anode conductivity, and also prevent anode surface from forming Ni depleted layer to block current passage after multiple-stage sintering process, and also effectively increase SOFC unit cell performance.

2. Description of the Prior Art

Presently when crude oil production is shrinking and environmental protection consciousness is rising, seeking alternative energy source is an urgent task. Solid oxide fuel cell has high efficiency, low pollution, versatile modulized structure and sustainable power generation ability. It is the power generation device with the most potential.

The operation temperature for traditional YSZ electrolyte supported cell (ESC) is between 800~1000° C. Its electrolyte substrate thickness is about 150~300 μm. Mainly due to thick electrolyte substrate, ESC type cell operates at high temperature. The mainstream product is (NiO+YSZ) anode supported cell (ASC), which has electrolyte layer (YSZ as primary material) and thickness is around 10 μm, and it can lower the operation temperature to 650~800° C. A common ASC membrane electrolyte assembly (MEA) process is first to synthesize anode, and then conduct sintering for electrolyte and cathode. It usually takes at least three high-temperature sintering processes (about 1400° C.). The multiple-stage sintering process would usually cause compositional change or deformation, so it increases cell resistance. The novel development for this technology is primarily to maintain the traditional manufacturing process and use a novel treatment process that can effectively solve the negative issues with multiple-stage sintering. This novel process can effectively reduce resistance, increase ion conductivity and increase SOFC power generation.

SUMMARY OF THE INVENTION

The main objective for the invention is to provide a novel manufacturing process for SOFC-MEA to increase electric performance of solid oxide fuel cell-membrane electrolyte assembly (SOFC-MEA). Because the SOFC-MEA of the present invention has features of 1) low resistance, 2) excellent interfacial adhesion, thus, it can increase cell power generation density and provide a stable and long-term electric output.

The process in the invention uses tape casting process to produce electrode substrate green tapes. The green tape substrate is subject to calcinations/sintering to complete the formation of electrode substrate. Afterward, the surface on one side of the electrode is through abrasion and polishing to provide good surface flatness for producing electrolyte. The membrane fabrication process can be screen printing, sputtering coating, spin coating and spray coating. After anode/electrolyte sintering process, the above surface treatment can produce good interfacial adhesion between electrode and electrode of SOFC half cell. Then screen printing is used to coat cathode onto the electrolyte of the half cell. Then the high-temperature sintering process will lead to completion of SOFC full unit cell. The completed full unit cell is subject to abrasion treatment on anode surface, after which the cell performance will be significantly improved. As a result, the resistance between MEA and current collector is greatly reduced. Therefore, the invention can produce high conductivity/low resistance SOFC unit cell.

The above and other objects, features and advantages of the present invention will become apparent from the following detailed description taken with the accompanying drawings.

DETAILED DESCRIPTION OF THE PREFERRED EMBODIMENT

The invention uses a novel process to produce high conductivity/low resistance (8YSZ/GDC/YDC/LDC) planar solid oxide fuel cell. The procedures for the process are as follows:

Step 1: Use tape casting to produce anode green tapes for planar SOFC-MEA. Cut and laminate the green tapes, so their thickness is 600~1200 μm. Conduct sintering between 1200° C.~1500° C. (preferably 1400° C.) for several hours to produce the first stage anode supported substrate for SOFC. The material in this stage can be NiO/YSZ, NiO/GDC, NiO/YDC, and NiO/SDC.

Step 2: On the anode supported substrate, conduct abrasion and polishing on the surface of one side, and then use ultrasonic to clean up. After drying, use membrane electrolyte fabrication processes, for example, screen printing coating, sputtering, spin coating and spray coating to produce electrolyte layer with thickness less than 10 μm. Conduct sintering at 1200° C.~1500° C. for several hours to complete the production of half cell. Use scanning electronic microscope (SEM) to analyze the microstructure of the half cell to assure the electrolyte layer is open pore free and fully dense, and has good interfacial adhesion between electrode and electrolyte.

Figure 1:
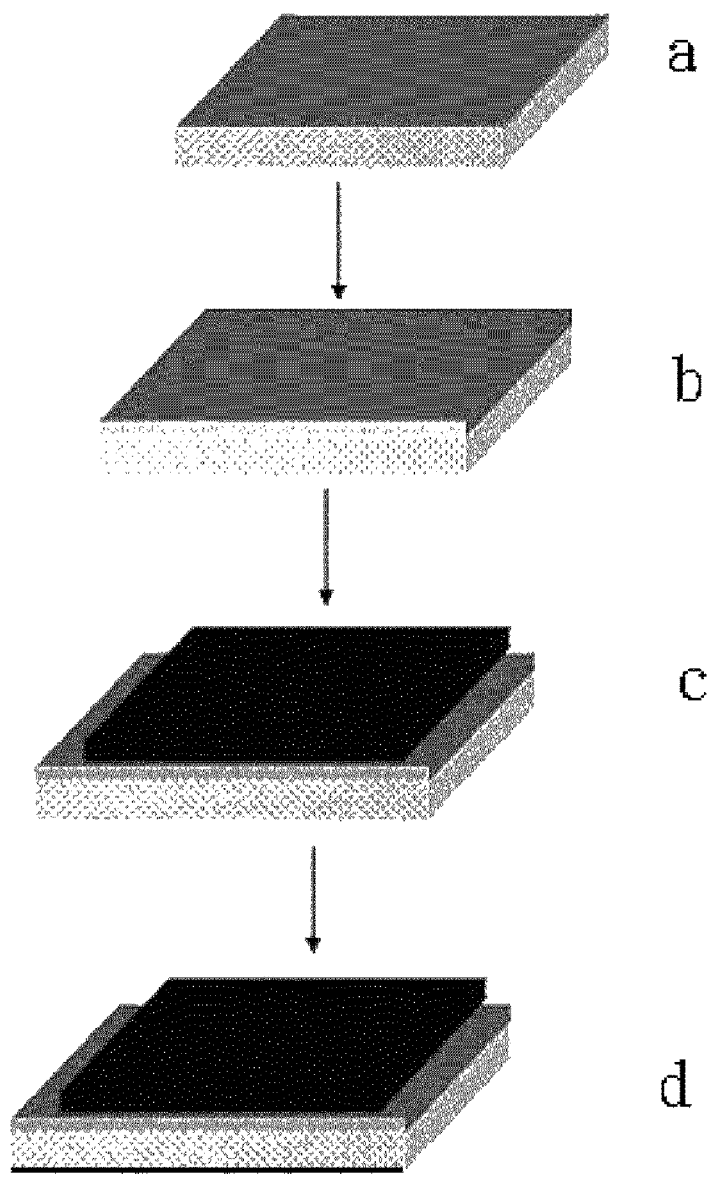
FIG. 1 is a concise illustration of the process in the invention, which comprises (a) anode substrate production, (b) producing electrolyte layer on polished surface of anode, (c) producing cathode, and (d) polishing anode surface.

Step 3: Onto the electrolyte layer of the half cell, use screen printing technology to build porous cathode layer (usually material is LSM or LSCF etc.). Then conduct sintering for about 3 hours at about 1200° C. to complete the fabrication of SOFC-MEA. The SOFC-MEA produced from the process has high operational performance, durability and stability. The excellent properties can be verified by performance test of SOFC-MEA. The simple process flow diagram for the above Step 1 to Step 3 is shown in FIG. 1.

Embodiment 1

Step 1: This is a process to produce high conductivity/low resistance planar SOFC-MEA (Unit Cell). The anode substrate for MEA is made of 50 wt % NiO+50 wt % 8YSZ and a certain amount of graphite (pore former). Use tape casting to produce electrode green tapes and laminate them to be 600~1000 μm thick and in the size of 5×5 cm$^2$~10×10 cm$^2$. Conduct sintering for the cut and laminated anode green tapes at 1400° C. for four hours to produce the first stage anode supported substrate for SOFC.

Step 2: Conduct surface abrasion and polishing for the SOFC anode supported substrate. First, use coarse sand paper to do surface pre-abrasion and polishing, and then change to finer sand paper. This step is to assure the flatness of the anode supported substrate.

Figure 2:
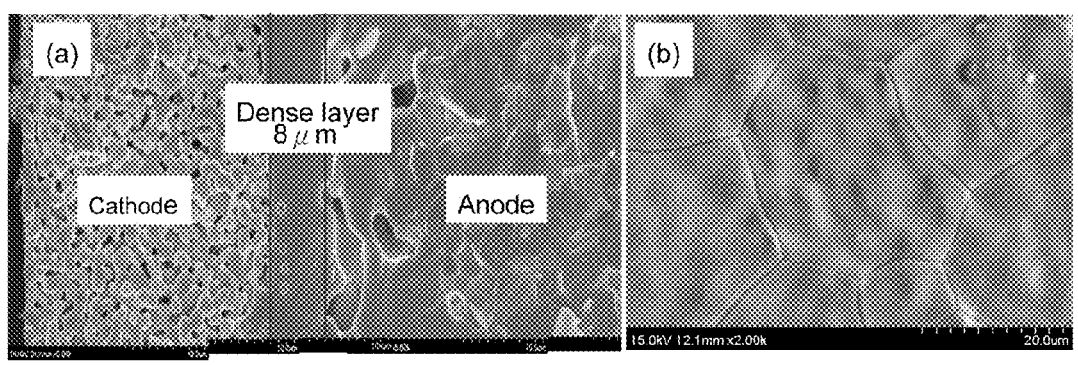
FIG. 2 is the SEM picture for the cross-sectional microstructure of the solid oxide fuel cell that is prepared with the combined technologies of electrode substrate fabrication and anode surface abrasion and polishing, as well as electrolyte membrane fabrication with specific sintering condition.

Step 3: Use spin coating to build electrolyte (thickness is less than 10 μm) onto the polished electrode surface to produce SOFC half cell with green tape of electrolyte. Conduct sintering between 1200° C.~1600° C. (preferably 1400° C.) for several hours (more than 4 hours) to obtain the first stage ceramic half cell. Use SEM to analyze the microstructure of half cell and assure good adhesion between electrode and electrolyte, and that the electrolyte layer is open pore free, as shown in FIG. 2. The electrolyte thickness is about 8 μm. It is a fully dense structure that is airtight.

Figure 3:
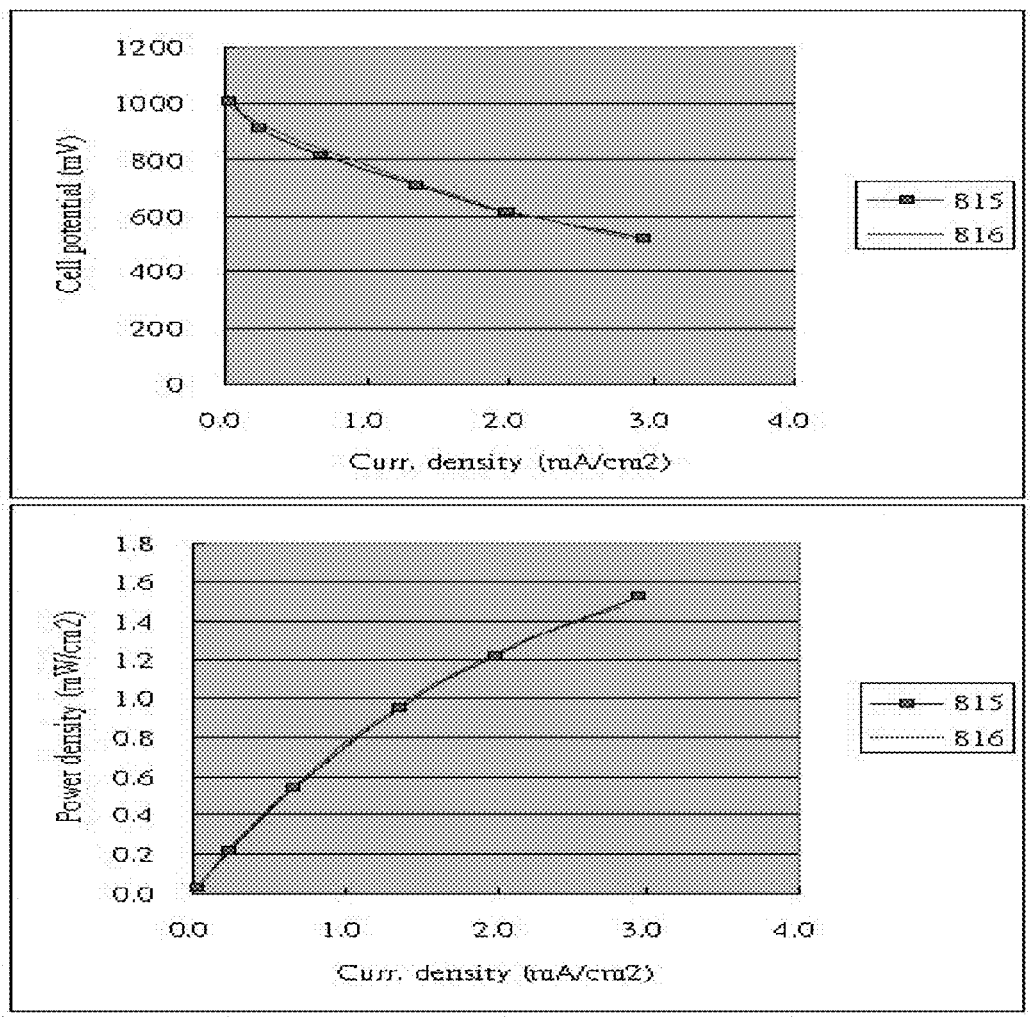
FIG. 3 is the result after two times of electrical performance testing for the solid oxide fuel cell that its surface is not treated with abrasion and polishing for Ni depleted layer.
Figure 4:
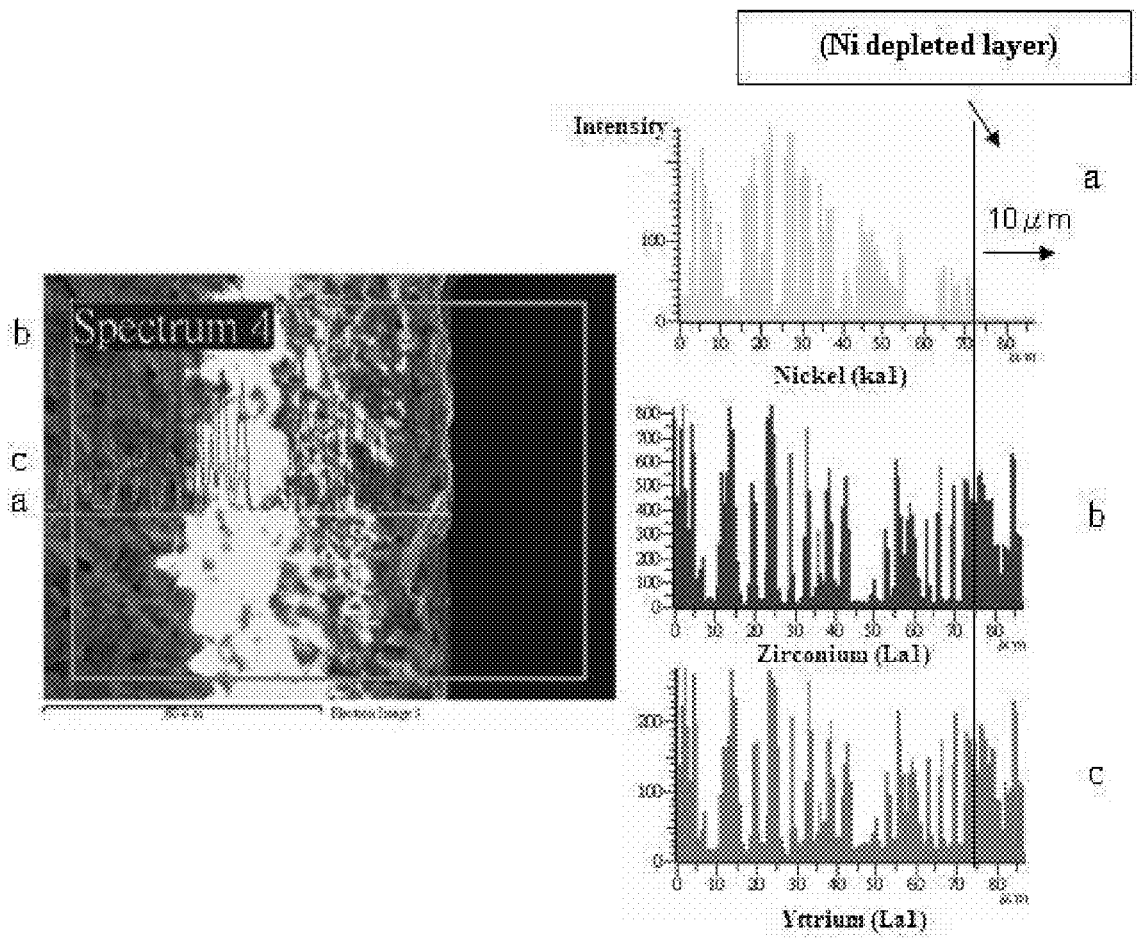
FIG. 4 is the compositional analysis of the anode surface of the solid oxide fuel cell with Ni depleted layer.
Figure 5:
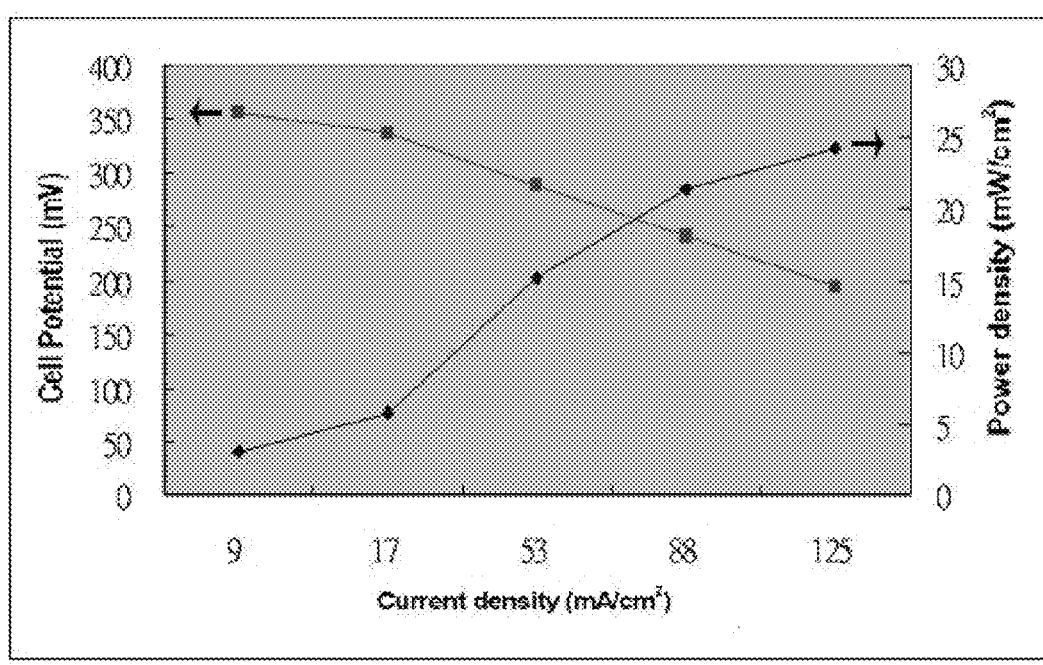
FIG. 5 is the result after electrical performance testing of the solid oxide fuel cell that its surface is treated with abrasion and polishing
Figure 6:
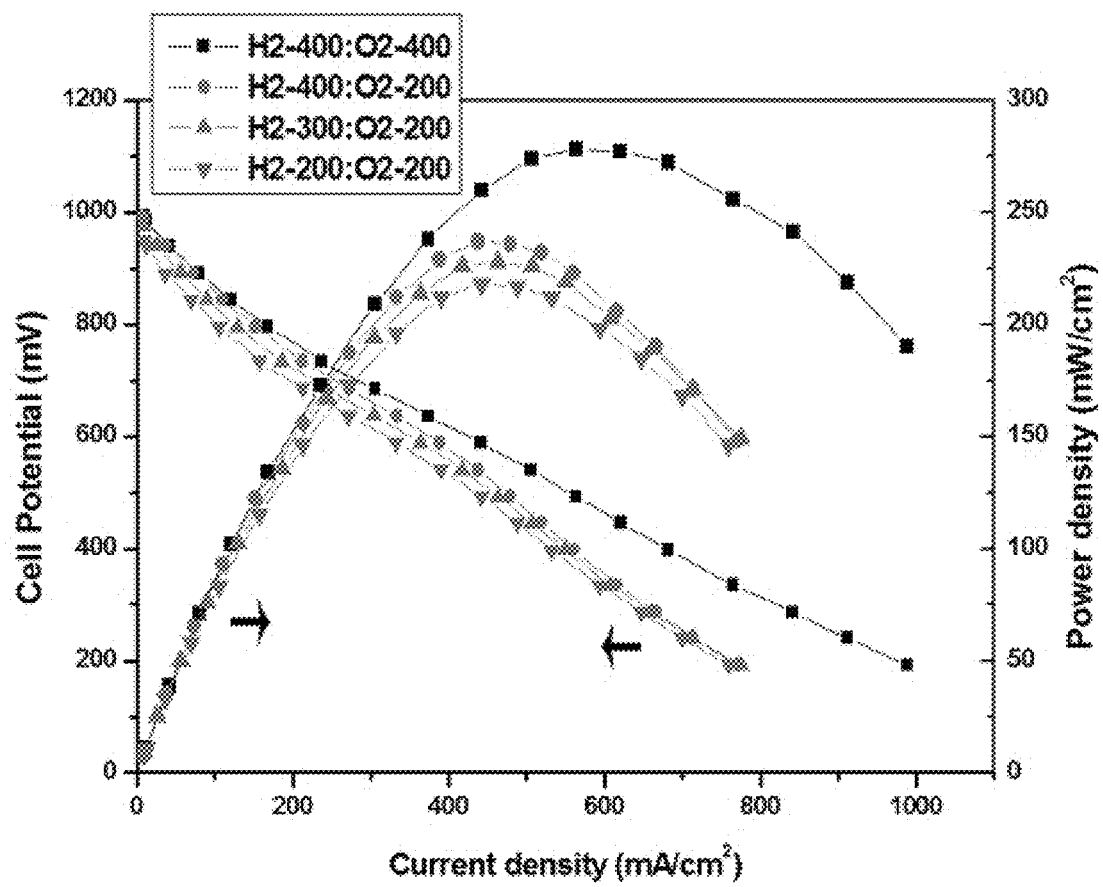
FIG. 6 is the result after electrical performance testing of the solid oxide fuel cell that is produced by the process in the invention (hydrogen and oxygen inlet flow rate 200~400 ml/min).

Step 4: Onto the electrolyte layer use screen printing process to build porous cathode layer of LSM material. Then conduct sintering at 1200° C. for 3 hrs. The sintering temperature rate can be, but not limited to, 3° C./min. This will lead to production of SOFC-MEA (Unit cell). The unit cell is subject to power performance testing. The result after two times of testing is shown in FIG. 3. It indicates OCV has reached the standard value. But its power density is poor because after multiple-stage sintering the anode surface becomes Ni depleted layer (about 10~20 μm thick) and forms an YSZ-rich electric insulation layer, as shown in FIG. 4. Thus, the unit cell is subject to anode surface polishing to remove nickel depleted layer (about 10~30 μm). Then the unit cell is subject to electric performance testing, which result is shown in FIG. 5. It indicates the unit cell through the novel process of treatment in the invention has clear improvement over the traditional untreated unit cell in electric performance. FIG. 6 is the testing result for the unit cell through electric performance testing. The maximum power density is as high as 278 mW/cm$^2$. It has proved this invention has met the patent requirements for excellence, innovation and technological criticalness. Thus, a patent application is submitted.

What is claimed is:

1. An anode treatment process to increase the power density of a planar solid oxide fuel cell membrane electrode assembly (SOFC-MEA) with full dense electrolyte layer, comprising:
   a. preparing anode electrode green tapes with 50 wt % NiO+50 wt % 8YSZ and an additional certain amount of graphite, cutting and laminating the produced anode electrode green tapes, and conducting sintering for the anode electrode green tapes at 1400° C. for 4 hours to produce a first stage of anode electrode supported substrate;
   b. conducting abrasion and polishing for one side surface of the first stage anode electrode supported substrate;
   c. coating a membrane electrolyte layer having a thickness less than 10 μm of electrolyte layer onto the polished anode electrode surface to obtain a SOFC half cell;
   d. conducting sintering of the SOFC half cell at about 1400° C. for more than 4 hours to obtain a ceramic half cell;
   e. evaluating the ceramic half cell obtained in step d with SEM to determine if open pores are remained, wherein if open pores remain, repeating step c and d until the open pores are removed, and wherein if open pores do not remain, proceeding to step f;
   f. printing cathode materials onto the membrane electrolyte layer of the ceramic half cell and conducting sintering of the ceramic half cell at 1200° C. for about 3 hours, wherein the temperature rate is 3° C./min, to complete fabrication of membrane electrode assembly (MEA);
   g. conducting abrasion and polishing on the anode surface of the completed MEA, wherein the polishing depth is from 10 to 30 μm to remove Ni depletion layer; and
   h. conducting performance testing for and measuring power density of the polished MEA;
   wherein Step b further comprises smoothening of the one side surface of the first stage anode electrode supported substrate, and wherein an abrader and polishing machine performs the abrasion and polishing.

2. The anode treatment process of claim 1, wherein Step b further comprises smoothening of the one side surface of the first stage anode electrode supported substrate, and wherein the abrasion and polishing are performed with sand papers.

* * * * *